United States Patent
Caprioli

(10) Patent No.: US 10,241,787 B2
(45) Date of Patent: Mar. 26, 2019

(54) CONTROL TRANSFER OVERRIDE

(71) Applicant: Intel Corporation, Santa Clara, CA (US)

(72) Inventor: Paul Caprioli, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 638 days.

(21) Appl. No.: 14/231,509

(22) Filed: Mar. 31, 2014

(65) Prior Publication Data

US 2015/0278116 A1  Oct. 1, 2015

(51) Int. Cl.
*G06F 9/00* (2006.01)
*G06F 11/00* (2006.01)
*G06F 21/00* (2013.01)
*G06F 21/52* (2013.01)
*G06F 21/72* (2013.01)

(52) U.S. Cl.
CPC ............... *G06F 9/00* (2013.01); *G06F 11/00* (2013.01); *G06F 21/00* (2013.01); *G06F 21/52* (2013.01); *G06F 21/72* (2013.01)

(58) Field of Classification Search
None
See application file for complete search history.

(56) References Cited

U.S. PATENT DOCUMENTS

| | | | | |
|---|---|---|---|---|
| 3,668,653 A * | 6/1972 | Fair | ............ | G05B 19/371 700/1 |
| 6,061,786 A * | 5/2000 | Witt | ............ | G06F 9/30152 712/213 |
| 6,775,764 B1 * | 8/2004 | Batcher | ............ | G06F 9/30043 707/999.003 |
| 2008/0040593 A1* | 2/2008 | Kaabouch | ............ | G06F 21/52 712/244 |
| 2008/0040607 A1* | 2/2008 | Kaabouch | ............ | G06F 21/558 713/172 |
| 2008/0209525 A1* | 8/2008 | Ben-Shoshan | ............ | G06F 21/126 726/4 |

* cited by examiner

*Primary Examiner* — Nanci N Wong
(74) *Attorney, Agent, or Firm* — Nicholson De Vos Webster & Elliot LLP

(57) ABSTRACT

Embodiments of an invention for control transfer overrides are disclosed. In one embodiment, a processor includes an instruction unit to receive a control transfer instruction. The instruction unit includes a transfer override register to provide an alternative target for the control transfer instruction.

15 Claims, 4 Drawing Sheets

METHOD 400

METHOD 400

CONTROL TRANSFER OVERRIDE

BACKGROUND

1. Field

The present disclosure pertains to the field of information processing, and more specifically, to execution control flow in information processing systems.

2. Description of Related Art

Information processing systems may provide for execution control to be transferred using an instruction. The security of an information processing system and the confidentiality and integrity of the information being processed might be compromised if an attacker is able to directly or indirectly use or misuse a control transfer instruction to maliciously transfer control. For example, an attacker might exploit a call stack to cause the execution of an attacker-chosen sequence of machine instructions including a return instruction that transfers control to code at a location desired by the attacker. Such a technique may be referred to as a return-oriented programming attack.

BRIEF DESCRIPTION OF THE FIGURES

The present invention is illustrated by way of example and not limitation in the accompanying figures.

DETAILED DESCRIPTION

Figure 1:
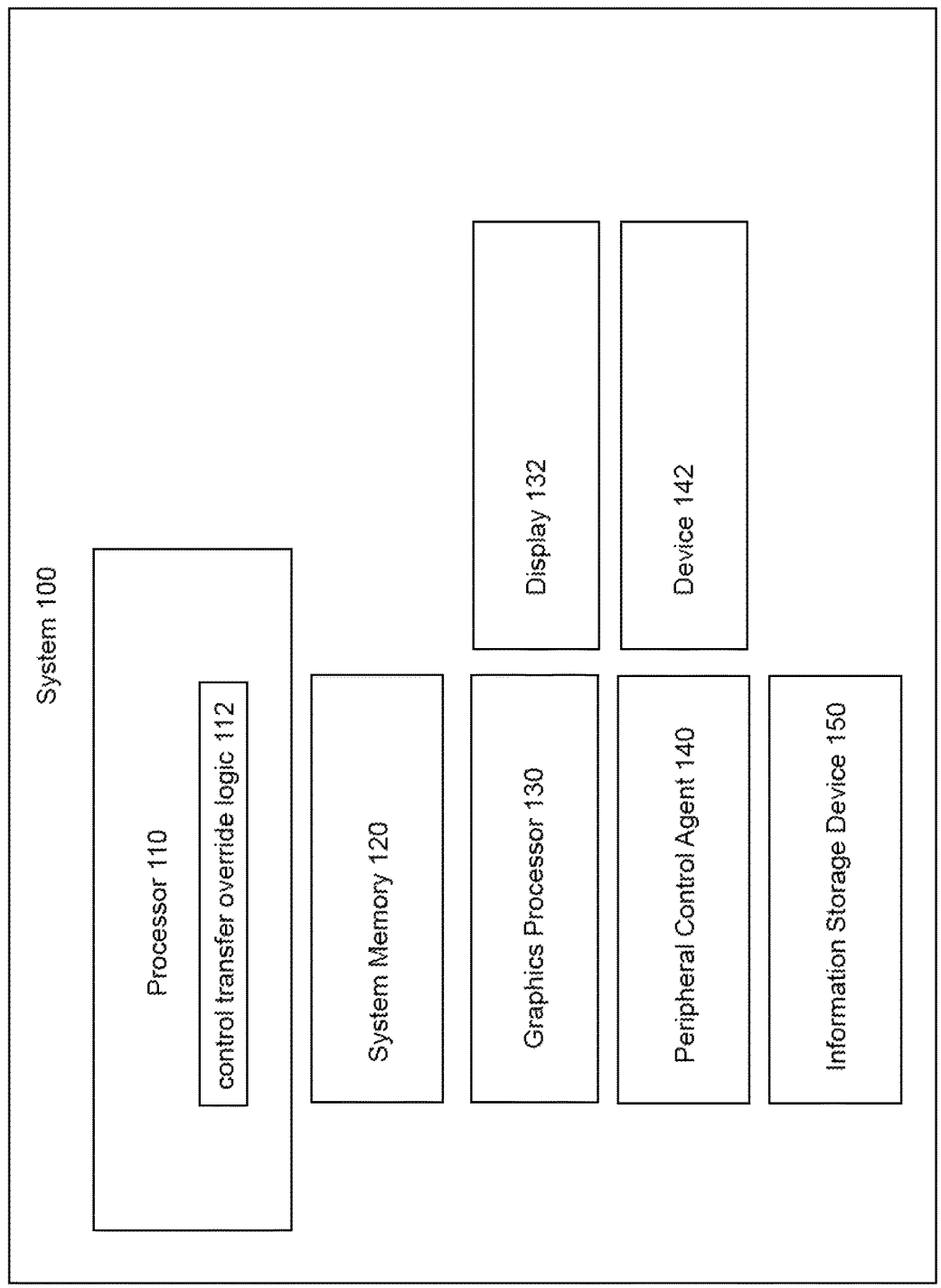
FIG. 1 illustrates a system including a processor providing for control transfer overrides according to an embodiment of the present invention.

Embodiments of an invention for control transfer overrides are described. In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

As used in this description and the claims, and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

Also, the terms "bit," "flag," "field," "entry," "indicator," etc., may be used to describe any type of location in a register, table, database, or other data or storage structure, whether implemented in hardware or software, but are not meant to limit embodiments of the invention to any particular type of location or number of bits or other elements within any particular location. The term "clear" may be used to indicate storing or otherwise causing the logical value of zero to be stored in a storage location, and the term "set" may be used to indicate storing or otherwise causing the logical value of one, all ones, or some other specified value to be stored in a storage location; however, these terms are not meant to limit embodiments of the present invention to any particular logical convention, as any logical convention may be used within embodiments of the present invention.

As described in the background section, an information processing system might be vulnerable to return-oriented programming ("ROP") or other attacks involving control transfers. Therefore, embodiments of the present invention may be desired to mitigate the possibility of success of such attacks, for example, to support an execution profiling approach to detecting malware. The use of an embodiment of the present invention may be desired as a higher performance alternative and/or a complement to using binary translation to insert checks and monitors into program code, particularly for code sections that are executed infrequently. Other uses of embodiments of the present invention are also possible, some of which may be described below.

FIG. 1 illustrates system 100, an information processing system including a processor providing for control transfer overrides according to an embodiment of the present invention. System 100 may represent any type of information processing system, such as a server, a desktop computer, a portable computer, a set-top box, a hand-held device such as a tablet or a smart phone, or an embedded control system. System 100 includes processor 110, system memory 120, graphics processor 130, peripheral control agent 140, and information storage device 150. Systems embodying the present invention may include any number of each of these components and any other components or other elements, such as peripherals and input/output devices. Any or all of the components or other elements in this or any system embodiment, may be connected, coupled, or otherwise in communication with each other through any number of buses, point-to-point, or other wired or wireless interfaces or connections, unless specified otherwise. Any components or other portions of system 100, whether shown in FIG. 1 or not shown in FIG. 1, may be integrated or otherwise included on or in a single chip (a system-on-a-chip or SOC), die, substrate, or package.

System memory 120 may be dynamic random access memory or any other type of medium readable by processor 110. Graphics processor 130 may include any processor or other component for processing graphics data for display 132. Peripheral control agent 140 may represent any component, such as a chipset component, including or through which peripheral, input/output (I/O), or other components or devices, such as device 142 (e.g., a touchscreen, keyboard, microphone, speaker, other audio device, camera, video or other media device, network adapter, motion or other sensor, receiver for global positioning or other information, etc.) and/or information storage device 150, may be connected or coupled to processor 110. Information storage device 150 may include any type of persistent or non-volatile memory or storage, such as a flash memory and/or a solid state, magnetic, or optical disk drive.

Processor 110 may represent one or more processors or processor cores integrated on a single substrate or packaged within a single package, each of which may include multiple threads and/or multiple execution cores, in any combination. Each processor represented as or in processor 110 may be any type of processor, including a general purpose microprocessor, a special purpose processor, or a microcontroller. Processor 110 may be architected and designed to operate according to any instruction set architecture, with or without being controlled by microcode.

Support for control transfer overrides may be implemented in a processor using any combination of circuitry and/or logic embedded in hardware, microcode, firmware, and/or other structures arranged as described below or according to any other approach, and is represented in FIG. 1 as control transfer override logic 112.

Figure 2:
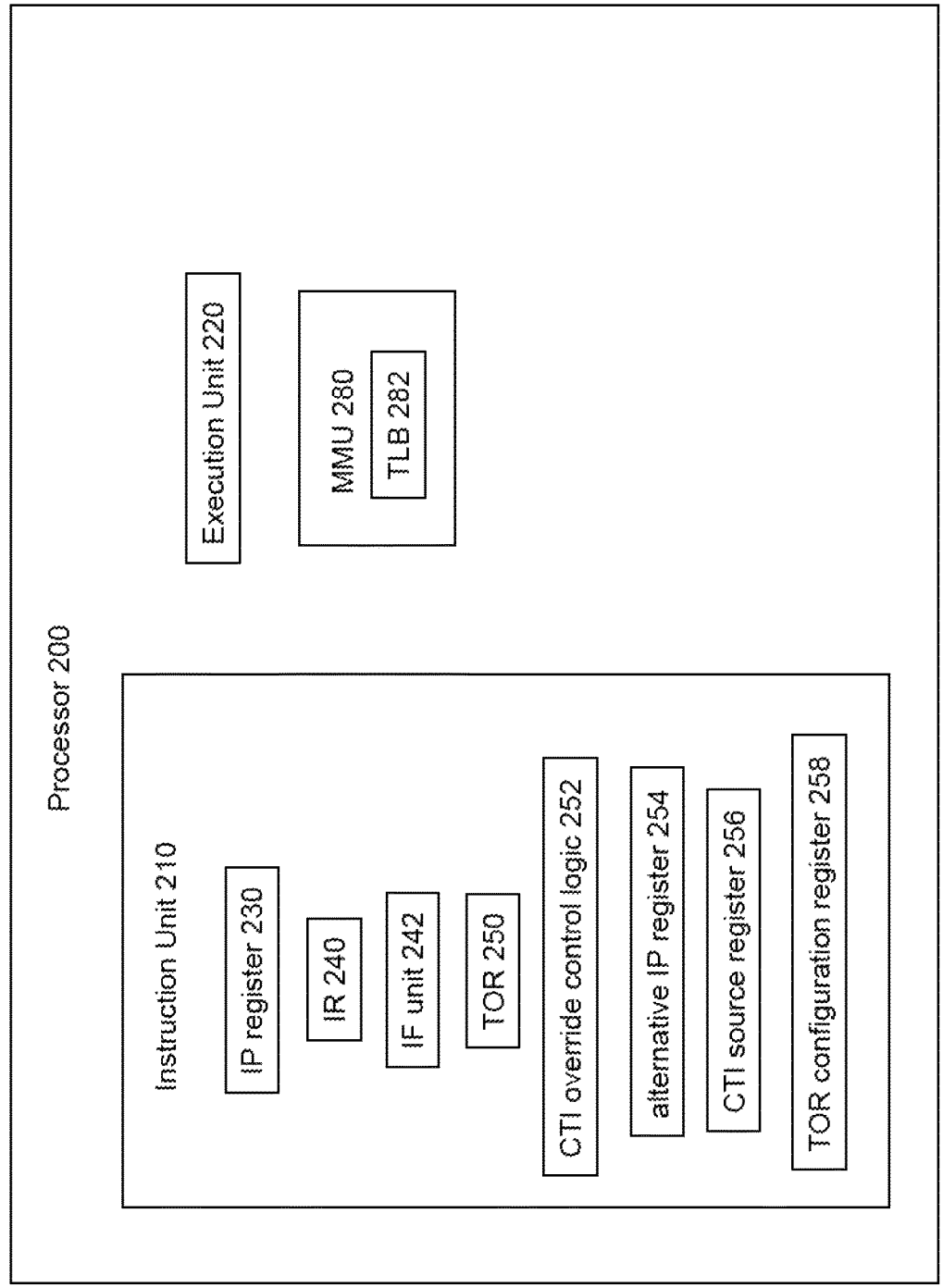
FIG. 2 illustrates a processor providing for control transfer overrides according to an embodiment of the present invention.

FIG. 2 illustrates processor 200, an embodiment of which may serve as processor 110 in system 100. Processor 200 may include instruction unit 210, execution unit 220, memory management unit (MMU) 280, and any other circuitry, structures, or logic not shown in FIG. 2. The functionality of control transfer override logic 112, as introduced above and further described below, may be contained in or distributed among any of the labeled units or elsewhere in processor 200.

Instruction unit 210 may include any circuitry, logic, structures, and/or other hardware for fetching, receiving, decoding, interpreting, and/or scheduling instructions to be executed by processor 200, including control transfer instructions (each, a "CTI"), such as a jump, a call (including a system call or syscall), a return (including a system return or sysret), a branch (including a conditional branch), and any other type of control transfer instruction (each, a "CTI"). Any one or more instruction types and/or formats may be used within the scope of the present invention. Execution unit 220 may include any circuitry, logic, structures, and/or other hardware, such as arithmetic units, logic units, floating point units, shifters, etc., for processing data and executing instructions.

MMU 280 may include any circuitry, logic, structures, and/or other hardware to manage the memory space of processor 200. Memory management logic supports the use of virtual memory to provide software with an address space for storing and accessing code and data that is larger than the address space of the physical memory in the system, e.g., system memory 120. The virtual memory space of processor 200 may be limited only by the number of address bits available to software running on the processor, while the physical memory space of processor 200 is further limited to the size of system memory 120. MMU 280 may support a memory management scheme, such as paging, to swap the executing software's code and data in and out of system memory 120 on an as-needed basis. As part of this scheme, the software may access the virtual memory space of the processor with an un-translated address that is translated by the processor to a translated address that the processor may use to access the physical memory space of the processor.

Accordingly, MMU 280 may include translation lookaside buffer (TLB) 282 to store translations of a virtual, logical, linear, or other un-translated address to a physical or other translated address, according to any known memory management technique, such as paging. To perform these address translations, MMU 280 may refer to one or more data structures stored in processor 200, system memory 120, any other storage location in system 100 not shown in FIG. 1, and/or any combination of these locations. The data structures may include page directories and page tables according to the architecture of any processor or processor family. One or more of the entries in such a data structure may hold access permissions indicating the allowable uses (e.g., read, write, and or execute) for which a page or other memory region or location may be accessed. Enforcement of such access permissions may include reporting a memory access violation in response to an unpermitted access attempt.

Returning to instruction unit 210, it may include instruction pointer ("IP") register 230, instruction register ("IR") 240, instruction fetch ("IF") unit 242, target override register ("TOR") 250, alternative IP register 254, CTI source register 256, and TOR configuration register 258, each of which may be a register or any other type of storage location.

IP register 230 may represent one of one or more registers or other storage to be used to hold one or more IPs or other information to directly or indirectly indicate the address or other location of an instruction currently being scheduled, decoded, executed, or otherwise handled; to be scheduled, decoded, executed, or otherwise handled immediately after the instruction currently being scheduled, decoded, executed, or otherwise handled (the "current instruction"), or to be scheduled, decoded, executed, or otherwise handled at a specified point (e.g., a specified number of instructions after the current instruction) in a stream of instructions. IP register 230 may be loaded according to any known instruction sequencing technique, such as through the advancement of an IP or through the use of a CTI.

IR 240 may represent one of one or more registers or other storage to be used to hold the current instruction and/or any other instruction(s) at a specified point in an instruction stream relative to the current instruction. IR 240 may be loaded according to any known instruction fetch technique, such as by an instruction fetch from the location in system memory 120 specified by the IP. IF unit 242 may represent circuitry and/or other hardware to perform and/or control the fetching of instructions from locations, for example, in system memory 120, specified by IPs and the loading of instructions into IR 240. IF unit 242 may be designed to perform the instruction fetch as a stage in an execution pipeline.

TOR 250 may be a programmable register available for software to use according to an embodiment of the present invention to specify an alternative target for a CTI. In general, but as may be more specifically described below or otherwise implemented, when a CTI override mechanism according to the present invention is enabled, CTI override control logic 252 causes the execution of a CTI, by execution unit 220 or otherwise, to result in a transfer of control to a location specified by the TOR instead of to the originally intended destination address of the CTI, and to store, in locations accessible by software, the source address and the originally intended destination address of the CTI.

In an embodiment, the contents of TOR 250 may specify the address of the alternative target. For example, execution of a CTI may result in the contents of TOR 250 being loaded into IP register 230 such that IR 240 will be loaded from the alternative target address. Alternatively, the micro-architecture of instruction unit 210 may provide for IP register 230 to be temporarily disabled such that the contents of TOR 250 may be used directly as an IP instead of the contents of IP register 230. Alternatively, the micro-architecture of instruction unit 210 may provide for IP register 230 to be temporarily disabled, the contents of TOR 250 to be loaded into alternative IP register 254, and the contents of alternative IP register 254 to be temporarily used as an IP until control is transferred to the original target of the CTI as further described below.

Figure 3:
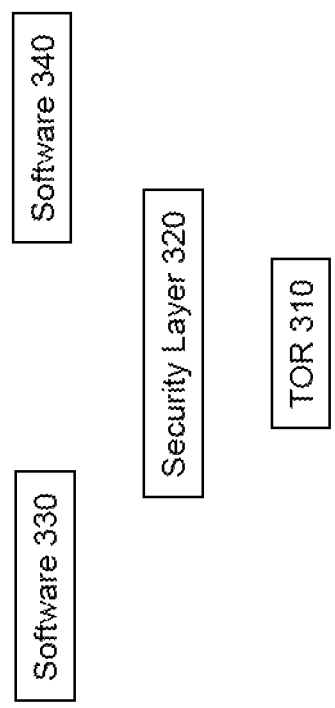
FIG. 3 illustrates a system architecture including a control transfer override capability according to an embodiment of the present invention.

FIG. 3 illustrates system architecture 300 having control transfer override capability according to an embodiment of the present invention. System architecture 300 includes TOR 310, which may be an embodiment of a TOR such as TOR 250 in FIG. 2. System architecture 300 also includes security layer 320, which may represent a defensive runtime layer or any other security firmware or software. System architecture 300 also includes software 330 and software 340, each of which may represent any application, system, or other software, or portion thereof (such as an applet or driver) running or installed to run within system architecture 300. Although system architecture 300 may not be intended to include malware, software 330 and/or software 340 may represent malware or a portion of application, system, or other software that has been corrupted by malware.

Using TOR 310 according to an embodiment of the present invention, control may be transferred to security layer 320 to perform integrity checking before control is passed to the originally intended target of a CTI. For example, software 330 may issue a first CTI to attempt to transfer control to an instruction in software 340, but control may be intercepted by security layer 320. Therefore, control flow integrity checking may be performed at every possible point of control flow change without having to interpret the intervening instructions, as might be otherwise be done with a fine-grained or other interpreter that performs software decode and emulation of every instruction.

After security layer 320 has performed integrity checking, it may pass control to the originally intended target of the first CTI. For this purpose, embodiments of the present invention may provide for hardware (e.g., instruction unit 210) to calculate or otherwise determine and/or continue to calculate or otherwise determine, even after execution control has been transferred to security layer 320, the location to which control would have transferred if the CTI override mechanism had been disabled. For example, the CTI may need to access flags to determine whether a branch should be taken or access registers or memory to calculate the target IP.

The result of this target IP calculation or other determination may be stored, by hardware, in a location accessible to security layer 320, such as alternative IP register 254 in FIG. 2. Therefore, security layer 320 may transfer control to software 340; for example, by reading the contents of alternative IP register 254 and issuing a second CTI to the indicated target, without the need for security layer 320 or other software to emulate the first CTI.

Additionally, CTI override control logic 252 may cause the source of the first CTI, for example, the address in system memory 120 from which it was loaded, to be stored in a location accessible by security layer 320, for example, CTI source register 256 in FIG. 2. Therefore, the source and destination of each CTI may be available to facilitate integrity checking. Embodiments of the present invention may not include alternative IP register 254 and/or CTI source register 256. Instead, embodiments may provide for CTI override control logic 252 to store a CTI source and/or destination in any other location accessible by software, such as a stack or a location in system memory 120 that may have an address provided or established by security layer 320.

Alternatively, the micro-architecture of instruction unit 210 may provide for IP register 230 to be temporarily disabled in response to the first CTI, the contents of TOR 250 to be loaded into alternative IP register 256, and the contents of alternative IP register 256 to be temporarily used as an IP. Meanwhile, the hardware may continue to calculate or otherwise determine the target of the first CTI and load that address into IP register 230 such that, in response to the second CTI or some other event indicating that security layer 320 has completed integrity checking, alternative IP register 256 may be disabled and IP register 230 may be re-enabled to transfer control to the original target of the first CTI.

Various other implementations and/or other features of CTI override are possible within various embodiments of the present invention. Embodiments may include TOR configuration register 258, which may represent one or more programmable registers and/or one or more bits or fields of any other register or storage location for configuring the availability, functionality, and/or use of a CTI override feature according to an embodiment of the present invention. TOR configuration register 258 may include one bit for globally enabling and disabling the CTI override feature (alternatively, an otherwise unused bit in TOR 250 may be used as a global enable bit). TOR configuration register 258 may include a bit field for selectively enabling and disabling the CTI override feature depending on a type, opcode, source address, destination address, return destination address (e.g., if the CTI is a call instruction) or other parameter or attribute of a CTI.

TOR configuration register 258 may include one or more fields to specify one or more address ranges to control access to the CTI override feature and/or the registers and/or storage locations related to the CTI override feature (e.g., alternative IP register 254, CTI source register 256). These address range fields may provide for enabling or disabling the CTI override feature based on a virtual, logical, linear, physical, or any other address of the source and/or destination of a CTI. Alternatively, any other access control technique, such as that described above in connection with MMU 280, or a modification thereof, may be used.

Many other criteria for enabling and disabling the CTI override are possible within the scope of the present invention, including but not limited to: whether the CTI is to be taken (e.g., for a conditional branch), whether the CTI is forward or backward (e.g., for a branch), whether the CTI is direct or indirect (e.g., for a jump), whether the CTI will cause a change to the privilege level, the length and/or actual bytes of the CTI, etc. Additionally and/or instead, embodiments may provide for storing or otherwise recording (and enabling and disabling the storing) of any attributes, parameters, or other information related to a CTI and/or a CTI override, including but not limited to the attributes, parameters, and other information mentioned above.

Embodiments of the invention may be implemented according to a micro-architectural approach having a lower overhead than other implementations or alternative execution profiling techniques. For example, instruction fetch unit 242 may be designed to use and/or predict the use of the contents of TOR 250 as an IP in response to fetching a CTI, and to calculate and record (e.g., using a return-stack predictor) the target of the CTI. Therefore, clearing the execution pipeline to transfer control to security layer 320 and/or incurring a mispredict penalty when transferring control to the target of the CTI may be avoided.

Embodiments of the invention may use the contents of TOR 250 as a base address for calculating an IP. For example, a first type of CTI (e.g., relative branches) may vector to the base address, a second type of CTI (e.g., indirect jumps) may vector to the base address plus 0x40 a third type of CTI (e.g., calls) may vector to the base address plus 0x80, a fourth type of CTI (e.g., returns) may vector to the base address plus 0xC0, etc.

Figure 4:
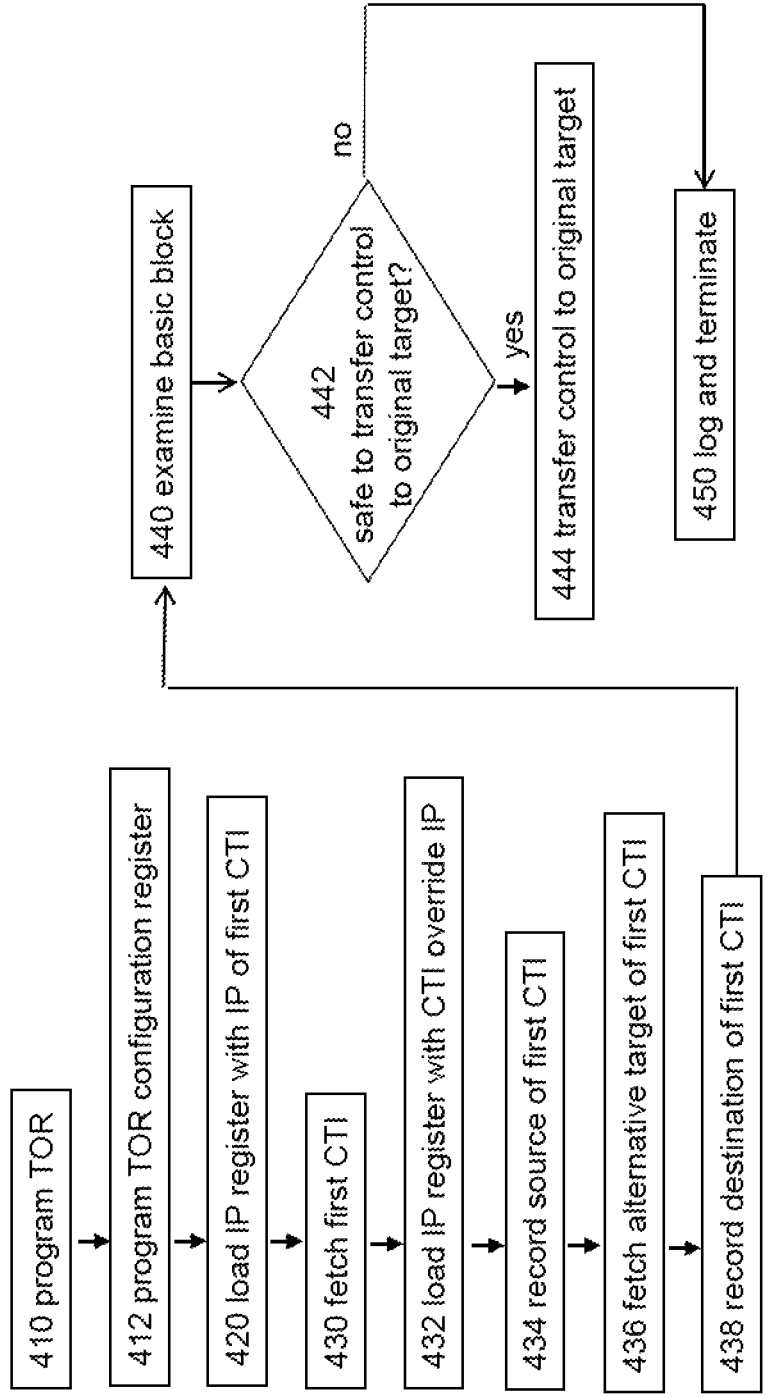
FIG. 4 illustrates a method of overriding a control transfer according to an embodiment of the present invention.

FIG. 4 illustrates method 400 including a control transfer override according to an embodiment of the present invention. Although method embodiments of the invention are not limited in this respect, reference may be made to elements of FIGS. 1, 2, and 3 to help describe the method embodiment of FIG. 4. Various portions of method 400 may be performed by hardware (e.g., instruction fetch unit 242, CTI override control logic 252), software (e.g., security layer 320), or a combination of hardware, firmware, and/or software.

In box 410 of method 400, a TOR (e.g., TOR 250) is programmed, for example by security layer 320, with an address to be used as a second IP, where the second IP points to an alternative CTI target instruction within security layer 320. In box 412, CTI override is enabled, for example, by setting an enable bit in a TOR configuration register (e.g., TOR configuration register 258) by security layer 320.

In box 420, a first IP is loaded into an IP register (e.g., IP register 230), where the IP points to a first CTI, for example, within software 330. The first CTI may specify an original target, for example, within software 340, for transferring execution control from software 330 to software 340. The section of code of software 330 that includes the first CTI may have been already examined by security layer 320 in a prior iteration of a portion of method 400, or otherwise.

In box 430, the first CTI is fetched and loaded into an IR (e.g., IR 240). In box 432, in response to fetching the first CTI when TOR 250 is enabled, the second IP is loaded into IP register 230 from TOR 250. In box 434, the source of the first CTI is stored in CTI source register 256. In box 436, the alternative CTI target instruction is fetched from security layer 320, instead of fetching the original CTI target instruction. In box 438, an IP to the original CTI target instruction is stored in alternative IP register 254.

Therefore, a control transfer from software 330 to software 340 is overridden and control is transferred to security layer 320 instead. Embodiments of the invention may include transferring control to security layer 320 for security layer 320 to detect ROP attacks, detect key-loggers, and/or perform other security checking according to various approaches, including the following.

In box 440, a portion of a program may be examined according to any known security protocol. The portion of the program examined may be a basic block, where a basic block may be a section of code between any two CTIs or between a target of a CTI and another CTI. For example, the basic block examined by security layer 320 in box 440 may be the portion of software 340 between and including the target of the first CTI and another CTI (the second CTI) within software 340. Examining the basic block may include guarding against stack pivot attacks by examining instructions that would change the stack pointer and guarding against ROP and jump-oriented programming attacks by examining characteristics of return and jump instructions.

In box 442, security layer 320 may determine, in response to the examination in box 430, whether it is safe to transfer control to the original target of the first CTI. If security layer 320 determines to transfer control to the original target of the first CTI, then method 400 continues in box 444, where execution control is transferred to the original target of the first CTI, for example, by using the IP stored in alternative IP register 254. If not, then method 400 continues in box 450, in which security layer 320 may log the issue and terminate the execution of software 330 and/or 340.

In other embodiments of the present invention, a CTI override feature may also or instead be used for a purpose other than security checking, such as to transfer control to a managed runtime environment (e.g., java, dalvik, a javascript engine, etc.). In an embodiment, a CTI within un-optimized code (code generated by binary translation for the purpose of binary compatibility, such as x86 code translated from ARM code) may be overridden so that control may be transferred to an optimizing compiler, an optimizing translator, or another managed runtime in order to collect performance data, create a dynamic control flow graph, determine which portions of the un-optimized code should be optimized, and/or guide the optimization process.

In an embodiment, one or more threads may include CTIs (e.g., indirect jumps or backward branches) to be used as safepoints where execution of all such threads may be stopped at the same time for garbage collection. In this embodiment, overhead may be reduced (e.g., below the overhead of an approach in which additional instructions are inserted in the threads to poll a memory location at the safepoints) by enabling CTI override to transfer each such CTI to a managed runtime to perform the garbage collection, and disabling CTI override when garbage collection is not being requested.

In various embodiments of the present invention, the method illustrated in FIG. 4 may be performed in a different order, with illustrated boxes combined or omitted, with additional boxes added, or with a combination of reordered, combined, omitted, or additional boxes. Furthermore, method embodiments of the present invention are not limited to method 400 or variations thereof. Many other method embodiments (as well as apparatus, system, and other embodiments) not described herein are possible within the scope of the present invention.

Embodiments or portions of embodiments of the present invention, as described above, may be stored on any form of a machine-readable medium. For example, all or part of method 400 may be embodied in software or firmware instructions that are stored on a medium readable by processor 110, which when executed by processor 110, cause processor 110 to execute an embodiment of the present invention. Also, aspects of the present invention may be embodied in data stored on a machine-readable medium, where the data represents a design or other information usable to fabricate all or part of processor 110.

Thus, embodiments of an invention for control transfer overrides have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:
1. A method comprising:
 programming, by software, a transfer override register in a processor to specify an alternative target address of a control transfer instruction having an original target address;
 enabling the transfer override register;
 issuing, to the processor, the control transfer instruction;

loading, by an instruction fetch circuit in the processor in response to the control transfer instruction, an instruction register in the processor from the alternative target address instead of the original target address;

calculating, in response to receiving the control transfer instruction when the programmable transfer override register is enabled, the original target address of the control transfer instruction; and storing, in response to receiving the control transfer instruction when the programmable transfer override register is enabled, the original target address of the control transfer instruction in an alternative instruction pointer register.

2. The method of claim 1, further comprising programming a configuration register to enable the transfer override register.

3. The method of claim 2, wherein control is transferred to the original target address instead of to the alternative target address is the transfer override register is disabled.

4. The method of claim 2, further comprising storing a control transfer instruction destination.

5. The method of claim 4, wherein storing a control transfer instruction destination includes storing a pointer to the original target address.

6. The method of claim 1, wherein the alternative target address of the control transfer instruction is a location within the security layer.

7. The method of claim 6, further comprising examining, by the security layer, code associated with the original target address.

8. The method of claim 7, further comprising determining, by the security layer, whether to transfer control to the original target address, and transferring, in response to the determining, control to the original target address.

9. A processor comprising:
an instruction unit to receive a control transfer instruction, the instruction unit including an instruction pointer register;
an alternative instruction pointer register;
an instruction register in which to store a current instruction to be executed by the processor;
a programmable transfer override register to specify an alternative target address of a control transfer instruction;
an instruction fetch circuit to load, in response to receiving the control transfer instruction, the instruction register from the alternative target address if the programmable transfer override register is enabled and from an original target address of the control transfer instruction if the programmable transfer override register is disabled; and
hardware to, in response to receiving the control transfer instruction when the programmable transfer override register is enabled, calculate the original target address of the control transfer instruction and store the original target address of the control transfer instruction in the alternative instruction pointer register.

10. The processor of claim 1, further comprising transfer override control logic to store a control transfer instruction destination.

11. The processor of claim 10, wherein storing the control transfer instruction destination includes storing a pointer to the original target address.

12. The processor of claim 1, further comprising a configuration register to be programmed to enable the programmable transfer override register.

13. The processor of claim 12, wherein the configuration register includes one or more fields to provide information to selectively enable the programmable transfer override register.

14. A system comprising:
a memory in which to store first software and second software, wherein the first software includes a control transfer instruction having an original target address in the second software; and
a processor including
an instruction unit to receive a control transfer instruction, the instruction unit including
an instruction pointer register;
an alternative instruction pointer register;
an instruction register in which to store a current instruction to be executed by the processor;
a programmable transfer override register to specify an alternative target address of the control transfer instruction;
an instruction fetch circuit to load, in response to receiving the control transfer instruction, the instruction register from the alternative target address if the programmable transfer override register is enabled and from the original target address of the control transfer instruction if the programmable transfer override register is disabled; and
hardware to, in response to receiving the control transfer instruction when the programmable transfer override register is enabled, calculate the original target address of the control transfer instruction and store the original target address of the control transfer instruction in the alternative instruction pointer register.

15. The system of claim 14, wherein the memory is also in which to store the security layer, and the alternative target address is within the security layer.

* * * * *